US007584028B2

(12) United States Patent
Burnside

(10) Patent No.: US 7,584,028 B2
(45) Date of Patent: Sep. 1, 2009

(54) METHODS AND SYSTEMS FOR IMPLEMENTING LOCATION BASED NOISE ABATEMENT PROCEDURES

(75) Inventor: Kevin A. Burnside, Renton, WA (US)

(73) Assignee: The Boeing Company, Chicago, IL (US)

( * ) Notice: Subject to any disclaimer, the term of this patent is extended or adjusted under 35 U.S.C. 154(b) by 211 days.

(21) Appl. No.: 11/559,782

(22) Filed: Nov. 14, 2006

(65) Prior Publication Data

US 2008/0114503 A1  May 15, 2008

(51) Int. Cl.
G01C 23/00 (2006.01)
G01C 21/10 (2006.01)
G05D 1/12 (2006.01)
(52) U.S. Cl. ............................. 701/3; 701/213; 244/188
(58) Field of Classification Search ................ 701/3, 701/213; 244/182
See application file for complete search history.

(56) References Cited

U.S. PATENT DOCUMENTS

| 3,822,047 | A | | 7/1974 | Schuldt, Jr. |
| 4,019,702 | A | * | 4/1977 | Annin ........................ 244/182 |
| 4,662,171 | A | | 5/1987 | Jackson et al. |
| 4,980,833 | A | | 12/1990 | Milligan et al. |
| 5,299,765 | A | * | 4/1994 | Blechen ...................... 244/182 |
| 5,337,982 | A | | 8/1994 | Sherry |
| 5,752,216 | A | * | 5/1998 | Carlson et al. .............. 701/120 |
| 6,198,991 | B1 | | 3/2001 | Yamakawa et al. |
| 6,880,784 | B1 | * | 4/2005 | Wilkinson et al. ........ 244/76 R |
| 2006/0111818 | A1 | | 5/2006 | Ishii et al. |

FOREIGN PATENT DOCUMENTS

EP          0549014 A1    6/1993

OTHER PUBLICATIONS

International Search Report of PCT/US2007/022387; Jul. 24, 2008; 13 pages.

* cited by examiner

*Primary Examiner*—Mark Hellner
*Assistant Examiner*—Helal A Algahaim
(74) *Attorney, Agent, or Firm*—Armstrong Teasdale LLP

(57) ABSTRACT

A method for controlling one or more of engine thrust cutback and engine thrust restoration is described which is related to aircraft environmental emissions abatement. The method comprises receiving aircraft location data from at least one navigational sensing system, comparing the aircraft location data against location data identifying an environmental emissions abatement area, and controlling at least one of thrust cutback and thrust restoration of the aircraft engines based on the comparing of aircraft location to the location of the environmental emissions abatement area.

20 Claims, 5 Drawing Sheets

METHODS AND SYSTEMS FOR IMPLEMENTING LOCATION BASED NOISE ABATEMENT PROCEDURES

BACKGROUND OF THE INVENTION

This invention relates generally to aircraft departure and landing noise abatement procedures, and more specifically, to methods and systems for implementing location based noise abatement procedures.

One means to reduce aircraft noise is to reduce thrust in the proximity of the noise-sensitive receiver. The relative position of the aircraft to a fixed receiver on the ground is an important factor in the resulting noise measured at the receiver location.

Current departure noise abatement procedures utilize aircraft altitude, or height, as a trigger for thrust reduction, thrust restoration, and subsequent aircraft acceleration. However, the location where an aircraft attains a specific altitude can vary due to operational and environmental factors. These operational and environmental factors can reduce the effectiveness of the altitude based noise abatement procedures, and may include, for example, aircraft type, a loading of the aircraft (passengers, cargo, and amount of fuel), and weather related conditions, just to name a few.

Due to the varying of the above mentioned operational and environmental factors, calculation and implementation of altitude-based thrust reduction cues are typically based upon conservative environmental and operational conditions. These conservative conditions ensure a thrust (and therefore noise emissions) associated with the aircraft engines is reduced to meet targeted noise constraints at one or more fixed ground receiver locations, without requiring calculating thrust reduction heights for actual environmental and operational conditions. To meet targeted noise constraints, specific departure noise abatement procedures may be based upon, and/or require the calculation of specific thrust reduction altitudes for a given set of operational and environmental conditions. Also, the procedures utilized to meet the targeted noise constraints, both for thrust reduction and restoration may be performed manually, and may not always be accurate and consistent. However, it is believed software tools are being developed that will calculate thrust reduction/restoration height cues that account for flight-specific operational and environmental conditions.

Current cues for thrust reduction, whether automatic or manual, are based upon the aircraft height above the ground, not relative lateral position to the receiver. A single, conservative, height-based reduction/restoration cue does not account for winds, piloting technique, non-design weights or other environmental and operational conditions.

Whether manually calculated or computer based, since conservative calculations are used, the aircraft that utilize these procedures tend to reduce thrust earlier than is necessary, and restore thrust later than is necessary, to meet the targeted noise constraints. Reduction of thrust earlier than necessary, and restoration of thrust later than necessary, reduces the efficiency of aircraft operation, for example, during take-off and landing maneuvers.

Additionally, flight-specific thrust reduction and restoration procedures should be calculated using current operational and environmental data, and with regard to pre-calculated thrust reduction and restoration procedures, such data may not be accurate at time of departure.

BRIEF DESCRIPTION OF THE INVENTION

In one aspect, a method for controlling one or more of engine thrust cutback and engine thrust restoration, as related to aircraft environmental emissions abatement is provided. The method includes receiving aircraft location data from at least one navigational sensing system, comparing the aircraft location data against location data identifying an environmental emissions abatement area, and controlling at least one of thrust cutback and thrust restoration of the aircraft engines based on the comparing of aircraft location to the location of the environmental emissions abatement area.

In another aspect, a flight management system for an aircraft is provided. The flight management system includes a flight management computer, at least one sensor system configured to provide a location of the aircraft to the flight management computer, at least one unit configured to provide the flight management computer with data relating to a position of one or more environmental emissions monitors, and a thrust management system. The thrust management system is communicatively coupled to the flight management computer which is operable to control operation of the thrust management system for meeting environmental emissions abatement standards, at least one of at least one of thrust cutback and thrust restoration based upon a comparison of aircraft location and environmental emissions monitor position by the flight management computer.

DETAILED DESCRIPTION OF THE INVENTION

Figure 1:
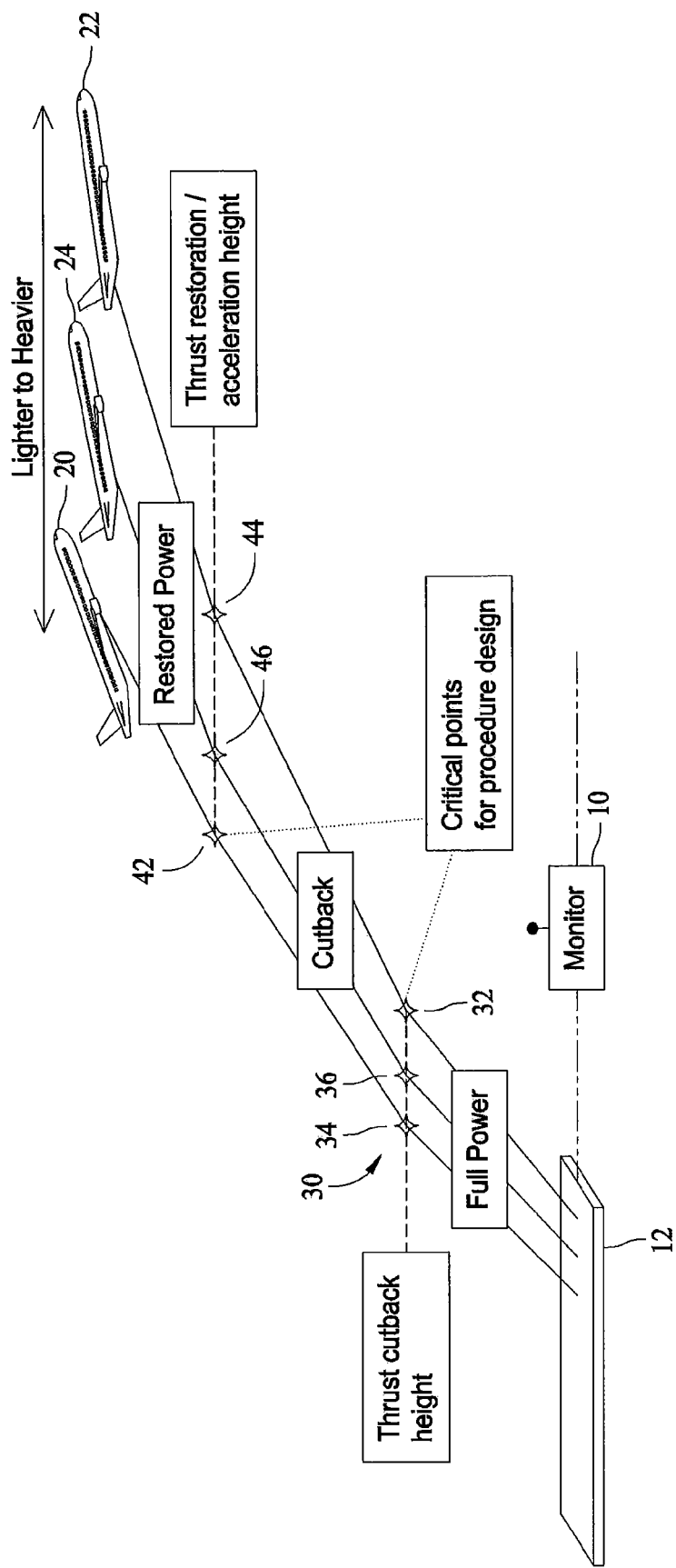
FIG. 1 is a diagram illustrating an altitude based noise abatement procedure.

FIG. 1 is a diagram functionally illustrating a currently used, altitude-based noise abatement procedure. A monitor 10 is located a distance form runway 12 to measure the noise, and other environmental emissions from aircraft that have taken off from runway 12. A similar configuration may be utilized to measure environmental emissions from landing aircraft. FIG. 1 further includes a depiction of three aircraft ascending from runway 12. For clarity it should be noted that all of the aircraft are of the same type. Aircraft 20 is the lightest of the three based on the amount of one or more of fuel, passengers, and cargo loaded thereon. Aircraft 22 is the heaviest of the three and aircraft 24 is loaded to have a weight in between aircraft 20 and 22. As used herein, environmental emissions includes, but is not limited to, noise emissions.

As is illustrated in FIG. 1, heavy aircraft 22 attains the thrust cutback height 30 (altitude) at a point farther from runway 12 than do aircraft 20 and 24. As further noted in FIG. 1, the point 32 where aircraft 22 attains the thrust cutback height 30 is denoted as a critical point in the noise abatement procedure design. More directly, point 32 is the point closet to monitor 10 where any of the differently loaded aircraft 20, 22, and 24 will attain the pre-defined thrust cutback height. Therefore, based on the desired environmental emissions level, an altitude associated with point 32 (based on the noise level detected by monitor 10) is utilized as the altitude for thrust cutback, regardless of aircraft loading, and regardless of aircraft position with respect to monitor 10. Since the environmental emissions procedure is altitude based, and although aircraft 20 and 24 attain such an altitude (34 and 36 respectively) sooner than aircraft 22, and farther from monitor 10, they cut back thrust earlier than would be necessary to meet the environmental emissions requirements. Cutting back thrust sooner than is necessary to meet environmental emissions requirements is detrimental to the efficient operation of aircrafts 20 and 24.

A similar problem is encountered when an altitude for thrust restoration is attained. As illustrated in FIG. 1, aircraft 20, since it is lighter, is the first of the aircraft to reach an altitude where the thrust can be restored. More specifically, point 42 is the point closet to monitor 10 where any of the differently loaded aircraft 20, 22, and 24 will attain the pre-defined thrust restoration height. Therefore, based on the desired environmental emissions level, an altitude associated with point 42 (based on the noise level detected by monitor 10) is utilized as the altitude for thrust restoration, regardless of aircraft loading, and regardless of aircraft position with respect to monitor 10. Since the environmental emissions procedure is altitude based, and although aircraft 22 and 24 attain such an altitude (44 and 46 respectively) later than aircraft 20, and farther from monitor 10, they restore thrust later than is necessary to meet the environmental emissions requirements. Similar to early cut back of thrust, restoration of thrust later than is required to meet environmental emissions requirements is detrimental to the efficient operation of aircrafts 22 and 24.

To summarize, and with respect to FIG. 1, it would be beneficial to implement a environmental emissions abatement procedure that would allow aircraft 20 and 24 to be closer in position to monitor 10 before thrust is cutback. Similarly, it would be beneficial to implement an environmental emissions abatement procedure that would allow aircraft 22 and 24 to be closer in position to monitor 10 when thrust is restored.

Figure 2:
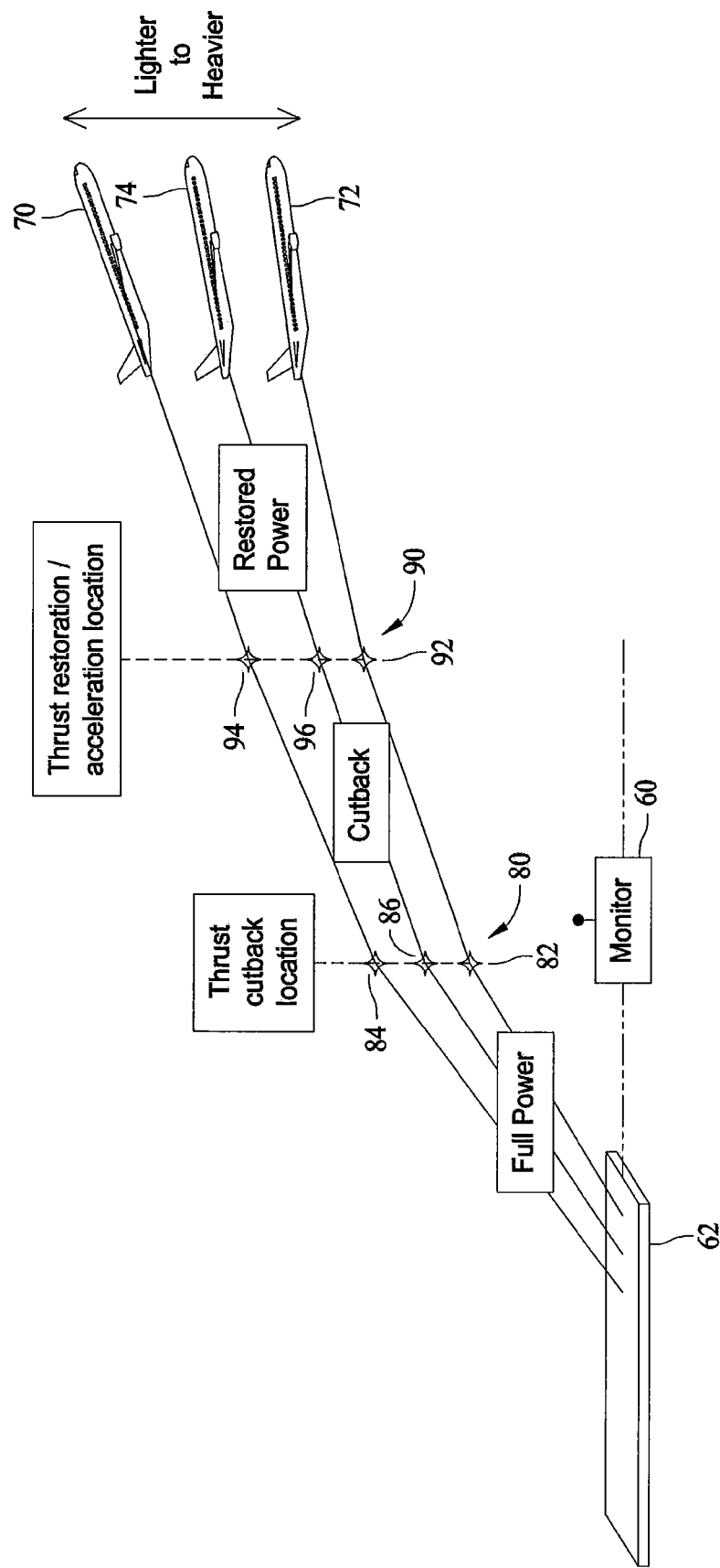
FIG. 2 is a diagram illustrating a location based noise abatement procedure.

FIG. 2 is a diagram illustrating a location based noise abatement procedure according to the present invention. A monitor 60 is located a distance form runway 62 to measure the noise, and other environmental emissions from aircraft that have taken off from runway 12. A similar configuration may be utilized to measure environmental emissions from landing aircraft. FIG. 2 also includes a depiction of three aircraft, all of the same type, ascending from runway 62. Aircraft 70 is the lightest of the three based on the amount of one or more of fuel, passengers, and cargo loaded thereon. Aircraft 72 is the heaviest of the three and aircraft 74 is loaded to have a weight in between aircraft 70 and 72.

As is illustrated in FIG. 2, all of the aircraft 70, 72, and 74 attain the thrust cutback location 80 at a point that is the same lateral distance from monitor 60. As further illustrated by FIG. 2, the point 82 where aircraft 72 arrives at the thrust cutback location 80 is a different altitude than is points 84 and 86, which are associated with aircraft 70 and 74 respectively. Specifically, thrust cutback location 80 is the location, relative to monitor 60, where any of the differently loaded aircraft 70, 72, and 74 will cutback on thrust, regardless of altitude.

Therefore, based on the desired environmental emissions level, thrust cutback location 80 (based on the noise level detected by monitor 60) is utilized as the location for thrust cutback, regardless of aircraft loading, and regardless of aircraft altitude with respect to monitor 60. Since the environmental emissions procedure is location based, that is, aircraft 70, 72, and 74 arrive at thrust cutback location 80 at various altitudes, they cut back thrust at a time that allows for more efficient operation of the aircraft than is accomplished using the above described altitude based methods.

Similar benefits are found when a location for thrust restoration is attained. As illustrated in FIG. 2, all of the aircraft 70, 72, and 74 attain the thrust restoration location 90 at a point that is the same lateral distance from monitor 60. As further illustrated by FIG. 2, the point 92 where aircraft 72 arrives at the thrust restoration location 90 is at a different altitude than is points 94 and 96, which are associated with aircraft 70 and 74 respectively. Specifically, thrust restoration location 90 is the location, relative to monitor 60, where any of the differently loaded aircraft 70, 72, and 74 will restore an amount of thrust, regardless of altitude.

Therefore, based on the desired environmental emissions level (e.g., a noise level detected by monitor 60), thrust restoration location 90 is utilized as the location for thrust restoration, regardless of aircraft loading, and regardless of aircraft altitude with respect to monitor 60. Since the environmental emissions procedure is location based, that is, aircraft 70, 72, and 74 arrive at thrust restoration location 90 at various altitudes, and they restore thrust at a time that allows for more efficient operation of the aircraft than is accomplished using the above described altitude based methods.

Figure 3:
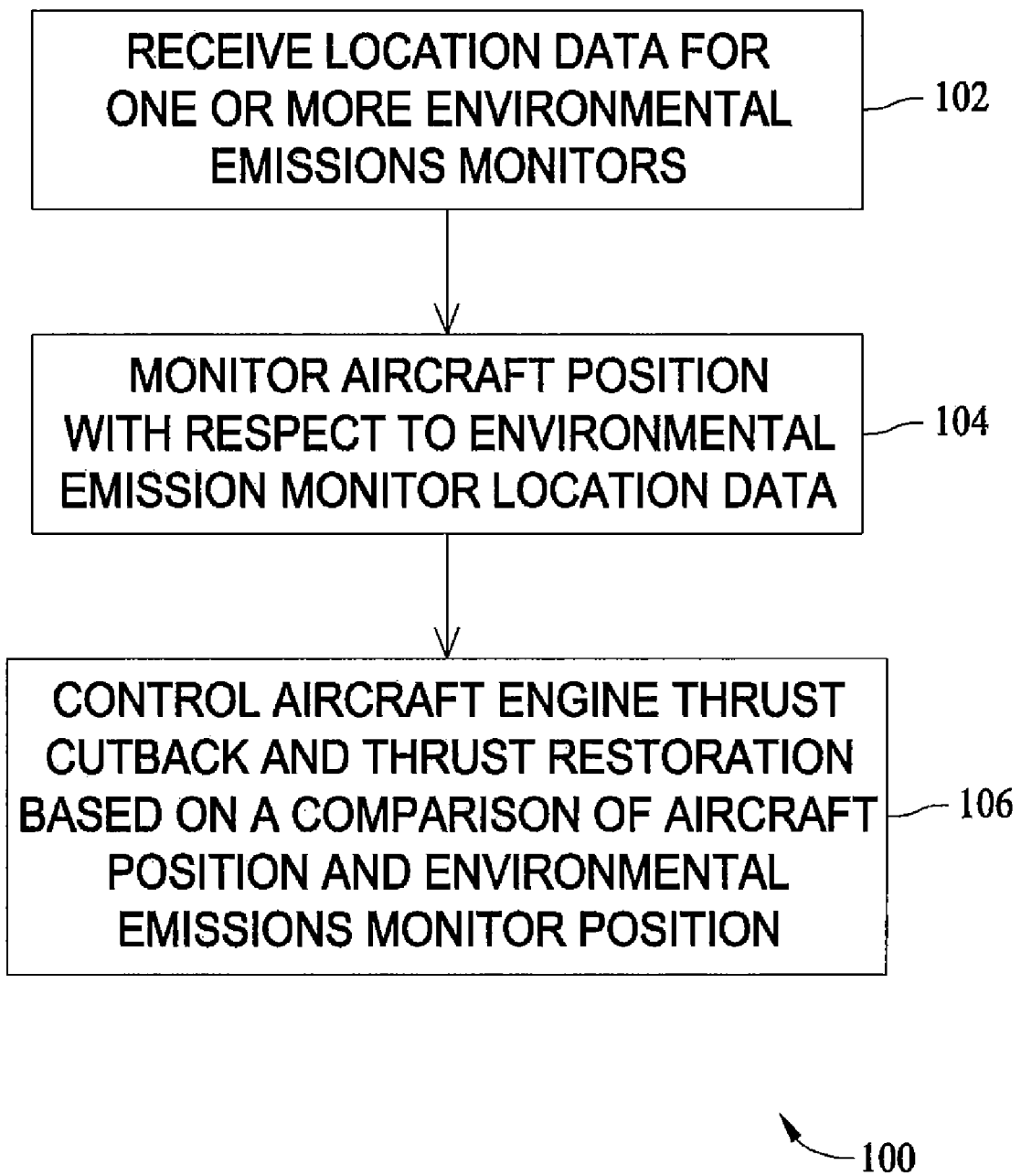
FIG. 3 is a flowchart describing the location based noise procedure of FIG. 2.

FIG. 3 is a flowchart 100 further illustrating the location based environmental noise abatement procedure depicted in FIG. 2. Specifically, an aircraft receives 102 location data for one or more environmental emissions monitors. In one embodiment, receiving 102 location data would include loading one or more of the flight management system computers with a database of monitor locations, for example, at a ground based aircraft maintenance station. Of course, wireless software loading methods for aircraft in flight are also known and may be modified to include a capability of uploading database of monitor locations. Monitor location includes, but is not limited to, latitude and longitude locations for the environmental emissions monitors and one or more surrounding latitude and longitude locations identifying where aircraft engine thrust is to be cutback or restored.

Referring again to flowchart 100, once the aircraft is loaded with environmental emissions monitor data and is in flight, aircraft position is monitored 104, for example, using a flight management system, with respect to the environmental emissions monitor location data. Aircraft engine thrust cutback and restoration, for abatement purposes, are controlled 106, based on a comparison of aircraft position and environmental emissions monitor position.

Figure 4:
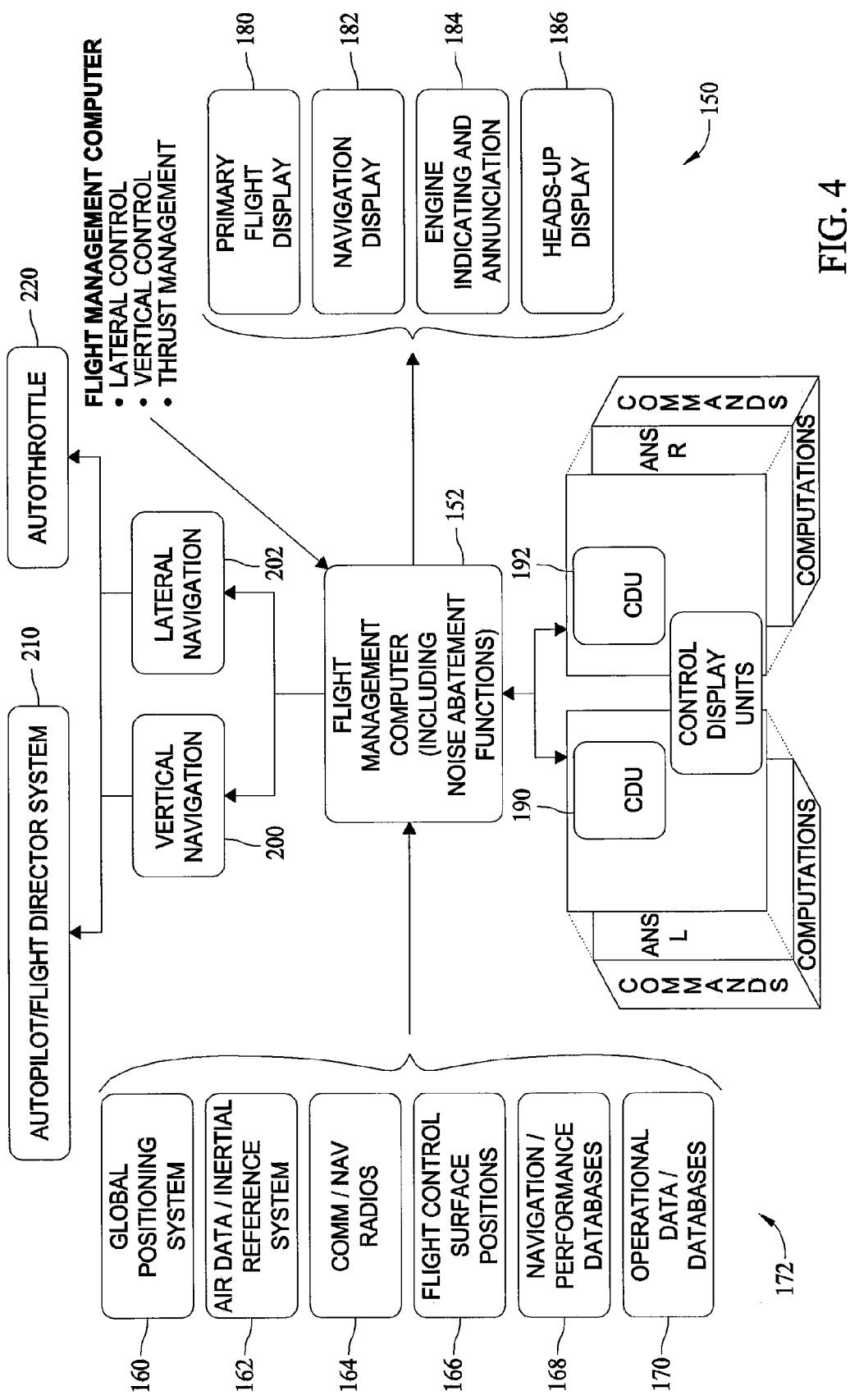
FIG. 4 is a block diagram of a flight management system.

FIG. 4 is a block diagram of a flight management system 150 that is utilized to perform the location based environmental emissions abatement procedures described with respect to FIGS. 2 and 3. Flight management system 150 includes a flight management computer 152 receiving data from one or more of, for example, a global positioning system (GPS) 160, an air data/inertial reference system 162, communications and navigation radios 164, flight control surface position monitors 166, navigation and aircraft performance databases 168, and operational data databases 170, which are commonly referred to herein as sensors 172. In one embodiment, flight management computer 152 is configured to provide at least lateral control, vertical control, and thrust management control for an aircraft. In performing these functions flight management computer 152 provides data related to these function to one or more of a primary flight display 180, a navigation display 182, an engine indication and annunciation display 184, and a heads up display 186.

Flight management computer 152 further communicates with one or more control display units (CDUs) 190 and 192, which provide a capability to input commands and computations to flight management computer 152. As indicated in the block diagram of flight management system 150, flight management computer 152 provides control of both vertical navigation functions 200 and lateral navigation functions 202, thereby providing control commands to one or both of an autopilot/flight director system 210 and an automatic throttle control system 220 (which is sometimes referred to herein as a thrust management system).

With regard to an environmental emissions function, flight management computer 152 is provided with position (location) data for one or more environmental emissions monitors, for example, from operational data databases 170 or from one of CDUs 190 and 192. Then based on aircraft position data received from one or more of GPS 160, air data/inertial reference system 162, or other sources, flight management computer 152 controls thrust cutback and restoration, for example, via commands sent to automatic throttle control system 220 as described above with respect to FIGS. 2 and 3. Aircraft position with respect to environmental emissions monitors is also controlled by flight management computer 152 through the vertical and lateral navigation functions 200 and 202.

Figure 5:
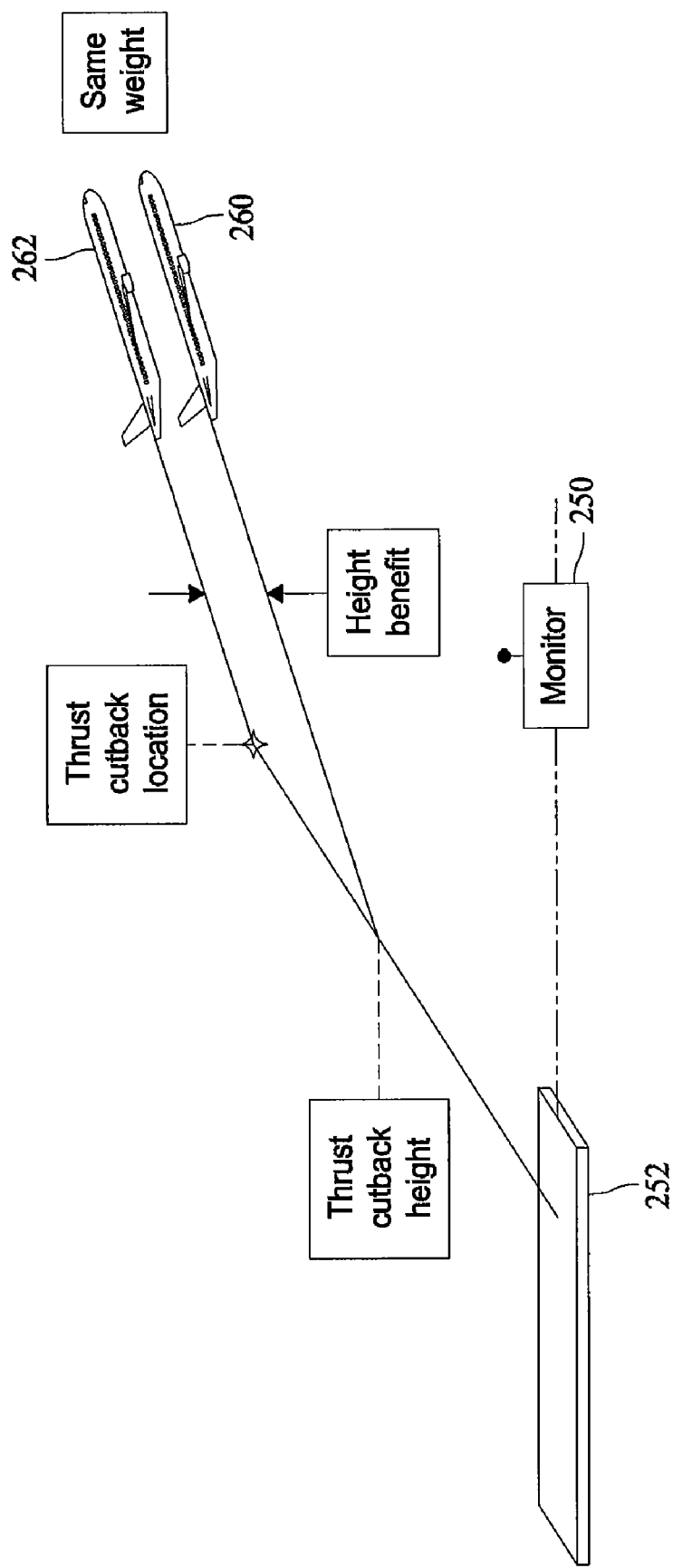
FIG. 5 is a diagram illustrating the benefit of the location based noise procedure of FIG. 2 compared to the altitude based noise abatement procedure of FIG. 1.

FIG. 5 is a diagram illustrating the benefit of the location based noise abatement procedure of FIG. 2 compared to the altitude based noise abatement procedure of FIG. 1 when such procedures are implemented within an aircraft flight management system. Referring specifically to FIG. 5, an environmental emissions monitor 250 and runway 252 are shown. Two aircraft of the same type and/or weight, (e.g., aircraft 260 and 262) are also shown. Aircraft 260 is illustrated as using the altitude based thrust cutback process and aircraft 262 is illustrated as using the herein described location based thrust cutback process.

When thrust cutback is based on altitude (height), while recognizing that attainment of altitude is a function of aircraft type and loading, the currently utilized environmental emissions abatement procedures may result in thrust cutback at a location that is farther away from monitor 250 than is needed to meet, for example, a noise abatement standard. As is illustrated in FIG. 5, by using a location based thrust cutback procedure to meet the noise abatement standards, a height benefit is attained over a similar aircraft using the height based procedure. This height benefit represents an efficiency in aircraft operation. It should be noted that utilization of location based environmental emissions abatement procedures results in thrust cutback altitudes that exceed the currently used minimum thrust cutback altitudes. While noise abatement is important, safety of flight is paramount, and the altitude based noise abatement procedures are based on a minimum altitude, which the above describe location based procedures meet or exceed.

A thrust reduction (cutback)/restoration cue that is based on a relative location or flight path distance selected to meet noise targets ensures thrust reduction occurs at the correct location despite adverse environmental and operational conditions, and allows favorable environmental and operational conditions to further reduce noise at the receiver (monitor) location. Additionally, a location-based thrust reduction cue reduces thrust at the correct location relative to the noise sensitive location regardless of environmental and operational factors.

The above described systems and methods relating to location-based thrust reduction and restoration therefore provide reliable noise reduction regardless of operational and environmental conditions, and therefore result in a further reduction in the noise at a receiver location when favorable environmental and operational conditions exist.

Still further, a location-based thrust reduction and restoration scheme can simplify training and dispatch requirements for operators who calculate flight-specific thrust reduction/restoration heights. The simplification results as location based methods are amenable to encoding in flight navigation databases allowing automated loading and execution of departure noise abatement procedures by the flight crew. Automated thrust reduction and restoration method also reduce flight crew workload and provide an increase accuracy over known thrust reduction and restoration methods.

Other embodiments are contemplated which utilize a combination of the currently known altitude based methods and the herein described location based thrust cutback and restoration methods. For example, in one embodiment, thrust cutback may be based on location and thrust restoration based on altitude. In another embodiment, thrust cutback may be based on altitude and thrust restoration based on location.

While the invention has been described in terms of various specific embodiments, those skilled in the art will recognize that the invention can be practiced with modification within the spirit and scope of the claims.

What is claimed is:

1. A method for controlling one or more of engine thrust cutback and engine thrust restoration, as related to aircraft environmental emissions abatement, said method comprising:
    receiving aircraft location data, including at least latitude data and longitude data, from at least one navigational sensing system;
    comparing the aircraft location data against location data, including at least latitude data and longitude data, identifying an environmental emissions abatement area; and
    controlling at least one of thrust cutback and thrust restoration of the aircraft engines based on a comparison of aircraft location relative to a location of the environmental emissions abatement area.

2. A method according to claim 1 wherein receiving aircraft location data from at least one navigational sensing system comprises receiving aircraft location data from at least one of a global positioning system, an air data system, and an inertial reference system.

3. A method according to claim 1 wherein comparing the aircraft location data against location data identifying an environmental emissions abatement area comprises accessing a database relating to a location of an environmental emissions monitor.

4. A method according to claim 3 wherein accessing a database relating to a location of an environmental emissions monitor comprises accessing a latitude and longitude for one or more environmental emissions monitors.

5. A method according to claim 1 wherein controlling at least one of thrust cutback and thrust restoration of the aircraft engines comprises controlling at least one of thrust cutback and thrust restoration based on a lateral distance from one or more environmental emissions monitors.

6. A method according to claim 5 further comprising accessing one or more latitude and longitude locations identifying where aircraft engine thrust is to be cutback or restored.

7. A method according to claim 1 wherein controlling at least one of thrust cutback and thrust restoration comprises:

controlling thrust cutback based on the comparing of aircraft location to the location of the environmental emissions abatement area; and controlling thrust restoration based on aircraft altitude.

8. A method according to claim 1 wherein controlling at least one of thrust cutback and thrust restoration comprises:
controlling thrust cutback based on aircraft altitude; and
controlling thrust restoration based on the comparing of aircraft location to the location of the environmental emissions abatement area.

9. A method according to claim 1 wherein environmental emissions abatement includes noise abatement.

10. A method according to claim 1 further comprising manually entering at least one of a thrust cutback location and a thrust restoration location through a control display unit.

11. A method according to claim 1 wherein controlling at least one of thrust cutback and thrust restoration of the aircraft engines comprises providing at least one of thrust cutback and thrust restoration commands to at least one of an autopilot/flight director system and an automatic throttle control system from a flight management computer.

12. A flight management system for an aircraft comprising:
a flight management computer;
at least one sensor system configured to provide a location, including at least latitude data and longitude data, of the aircraft to said flight management computer;
at least one unit configured to provide said flight management computer with data relating to a position of one or more environmental emissions monitors, the data including at least latitude data and longitude data; and
a thrust management system communicatively coupled to said flight management computer, said flight management computer operable to control operation of said thrust management system for meeting environmental emissions abatement standards, at least one of thrust cutback and thrust restoration based upon a comparison of aircraft location relative to a location of the environmental emissions monitor position.

13. A flight management system according to claim 12 wherein said at least one sensor system comprises at least one of a global positioning system, an air data system, and an inertial reference system.

14. A flight management system according to claim 12 wherein said at least one unit comprises a database of environmental emissions monitor locations.

15. A flight management system according to claim 12 wherein said at least one unit comprises a database of aircraft engine thrust cutback and thrust restoration locations.

16. A flight management system according to claim 12 wherein said flight management computer is configured to cause thrust management system to control at least one of thrust cutback and thrust restoration based on a lateral distance from one or more environmental emissions monitors.

17. A flight management system according to claim 12 wherein said flight management computer is configured to:
utilize said thrust management system to control thrust cutback based on a comparison of aircraft location and a location of an environmental emissions abatement area, the abatement area defined by the location of one or more of the environmental emissions monitors; and
utilize said thrust management system to control thrust restoration based on aircraft altitude.

18. A flight management system according to claim 12 wherein said flight management computer is configured to:
utilize said thrust management system to control thrust cutback based on aircraft altitude; and
utilize said thrust management system to control thrust restoration based on a comparison of aircraft location and a location of an environmental emissions abatement area.

19. A flight management system according to claim 12 further comprising at least one control display unit, said flight management system configured for manual entry of at least one of a thrust cutback location and a thrust restoration location through a said control display unit.

20. A flight management system according to claim 12 wherein said thrust management system comprises at least one of an autopilot/flight director system and an automatic throttle control system.

* * * * *